3,265,309
SWINGING NOZZLE DEVICE FOR CLEANING PIPES, STORAGE TANKS AND THE LIKE
Paul Hammelmann, 17 Zum Sundern, Oelde, Westphalia, Germany
Original application Jan. 31, 1961, Ser. No. 86,061. Divided and this application Jan. 13, 1965, Ser. No. 425,298
Claims priority, application Germany, Mar. 11, 1960, H 38,886
4 Claims. (Cl. 239—187)

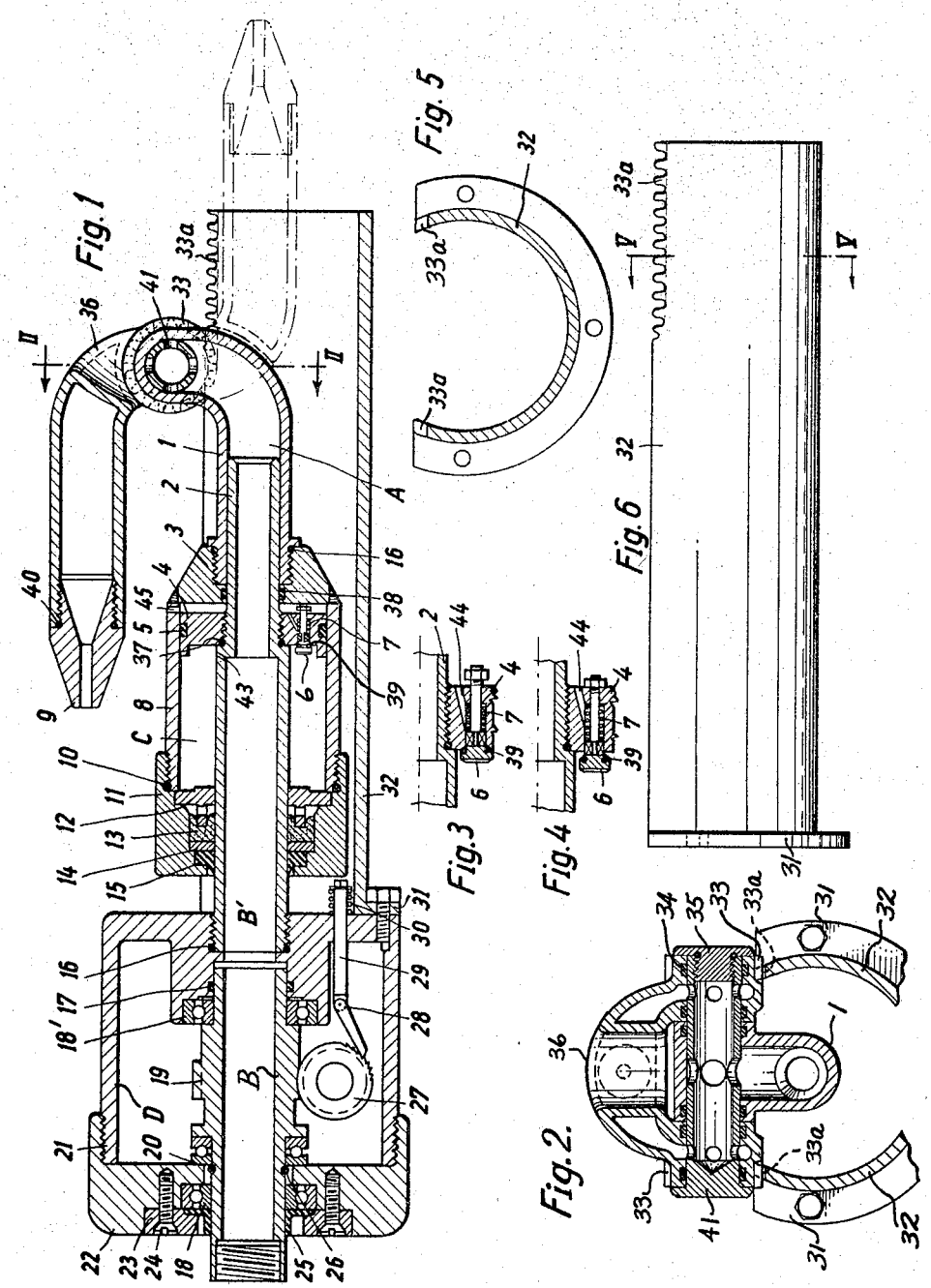

This application is a division of application Serial No. 86,061, filed Jan. 31, 1961 for a device for cleaning pipes, conduits and storage tanks and the like, now abandoned. This invention relates to a cleansing device which is intended for cleansing pipes and ducts, as well as storage and transport containers which are used for the transport and storage of oils and oil products and acids, as well as of milk, beer, fruit juices, and the like.

For this cleansing process, devices are known in which the cleansing fluid is sprayed systematically by cleansing heads with controlled nozzles, under high pressure, over the inner wall or interior of the pipe or container to be cleaned. The motion of the spraying head with nozzles is frequently controlled by a preceding high-speed turbine, which, whether it is operated with or without waste water, requires a bulky, costly transmission gear for reducing its speed. The nozzles then point backwards to the direction of the principal axis of the cleanser. Through the reaction or shock of the cleansing medium, in the form of liquid, steam or compressed gas jets, ejected at high pressure from the nozzles of the cleanser head carrying them, a backwardly directed jet reactive force is produced and transmitted to the cleanser and the supply hose connected to the cleanser head. If it is desired to impart a reverse thrust to the filling hose, the cleanser heads must be changed.

A disadvantage of sprinkler cleansers of the aforesaid type is that in pipe lines with bends, welded places or sluice valves, they do not always reach as far as the inspection point or point of access, which may be removable or accessible ports or joints in the pipe system. If the hose becomes jammed in the pipe, it is not easily withdrawn. This disadvantage is particularly great because the pulling effect of the reaction cleansing jets can inherently be exerted over very long stretches, for instance, up to 100 metres. If excessive frictional forces are encountered in the line to be cleansed, the line must be broken at some not easily accessible place in order to change the nozzles. In this connection also, it is an essential prerequisite that the pipe line should be accessible externally at the point where the trouble occurs. Sometimes the pipe line has to be cut in order to remove the obstruction or change the cleansing head.

An object of the invention is to provide a device for cleansing pipes and ducts, storage containers and the like, with a flexible hose connection for the controllable supply of a high-pressure liquid (30 to 80 atm.) into a head with a nozzle or nozzles which will oscillate back and forth to sweep along the wall of the pipe to be cleansed. The pressure of the liquid operates a piston and cylinder control mechanism to effect swinging of the nozzle back and forth to produce such wall-sweeping action. In addition the entire nozzle mounting can revolve to move progressively around the circumference of a pipe or tank the wall-sweeping oscillation of the nozzle or nozzles.

The invention is further based on the knowledge that as far as possible all rapidly rotating components should be eliminated within the drive and gear since, in addition to the difficulties in regard to sealing or packing, the constantly fluctuating temperatures require a simple and rugged construction.

Accordingly, it is a further feature of the invention that the swinging motion of the nozzle is automatically controlled by an auxiliary stream of pressure liquid.

The cleansing power of the head is increased compared with devices of known type with the same expenditure of cleansing agent. Cleansing is completed in a shorter time. Control means for the cleanser head can be constructed in different ways although, basically, in all cases what is required is a longitudinally movable, pressure-controlled control member.

Accordingly, the advantage is gained that pipes and ducts with sharp bends can be serviced and the nozzle head can travel through them in each case as desired either forwards or backwards.

The invention can advantageously be embodied in a compact form by using a reciprocable cylindrical casing with a fixed internal valved piston, spring loaded against the liquid pressure which, with fluctuating pressure, reciprocates the cylindrical casing.

A further feature of the cleansing head is that each time the swing of the nozzle completes a full cycle the nozzle mounting will be indexed to be shifted circumferentially through a predetermined angular increment of revolution. By varying the speed of swinging oscillation the cleanser head exerts a selectively controllable scrubbing action on the inside of the pipe or tank.

An exemplary embodiment of the invention is shown in the accompanying drawings, in which FIGURE 1 is a longitudinal section through the middle of the cleansing device;

FIGURE 2 is a section along II—II in FIGURE 1 taken in the direction of the arrow;

FIGURES 3 and 4 are enlarged detail sections of the valve control;

FIGURE 5 is an elevation of the left end of the protecting and carrying casing or sheath for the movable mouthpiece, and a section on V—V of FIGURE 6;

FIGURE 6 is a side view of the casing.

The principal components of the equipment are the spray or sprinkler tube mouthpiece A with part 36 pivoting through 180° which is seated with its part 1 on the end 2 of the liquid feed pipe B', the casing C for the hydraulic pressure control of the mouthpiece A, and the casing D for the rotation of the mouthpiece A with casing C about the axis of the pipe B.

The part 1 is rotatably seated on the end 2 of the hydraulic pipe B' aligned with the feed pipe B and is secured to the cover 3 of the cylindrical casing C. The mouthpiece A can be moved longitudinally along the hydraulic pipe B' by the action of the hydraulic control valve of the cylinder C.

The casing D for the mechanical rotational control is rotatable about the hydraulic pipe B by means of a toothed gear and carries the protective outer case 32 within which part 36 of the mouthpiece A swings or pivots upwards and downwards as the mouthpiece moves longitudinally to and fro with the cylindrical casing C.

The meshing of the gear 33 with the nonreciprocating rack 33a on the upper part of the casing 32 effects the swinging of part 36 through 180°. The rotational motion of casing 32 about the axis of pipe B occurs when the base or bottom of the cylindrical casing C in the extreme position of its rearward motion produced by hydraulic pressure abuts against the pushrod 29 of the mechanical rotary control in casing D to turn such casing by increments about the liquid feed pipe B by means of the associated toothed gear 27 (FIGURE 1).

The lower part 1 of the mouthpiece fits tightly but slidably on the front end extension 2 of the hydraulic pipe B'. Part 1 is secured to the cover 3 of the hydraulic cylinder C which further incorporates the jacket 8 and the base 11. Between the jacket 8 and the base 11 a hydraulic packing 10 is fitted. By the force on packing 13 transmitted through the spacer 14 the packing 15 is pressed into the base 11 of the hydraulic cylinder C by means of the spring ring 12, so that such cylinder, sealed against high liquid pressure, can both slide lengthwise along the hydraulic pipe B' and rotate about the axis of such pipe.

The piston 4 is permanently seated on a shoulder 37 of the pipe extension, such as by being screwed onto the extension 2 as shown, and is sealed to it. Cylinder cover 3 is mounted on the extension 2 at the side of piston 4 remote from pipe B and is sealed by the packing ring 38.

A very small hole 43 connects the pressure pipe B' with the interior of the hydraulic cylinder C as a bypass around the mouthpiece A. A valve 39 in the piston 4 loaded by a spring 7, by varying the hydraulic pressure, controls the passage 44 between the forward and rear sides of the piston 4.

FIGURES 3 shows the valve 39 in the closed position. FIGURE 4 shows it in the position open to that portion of the interior of the hydraulic cylinder C which is in liquid communication with the pressure pipe B' through the hole 43. When the valve 39 is in this position liquid may flow from pipe B' through hole 43 to the left chamber of cylinder C, past valve 39 through the passage 44 of the piston 4 to the right chamber of clylinder C and to the liquid discharge duct 45.

The spring 7 is shown in FIGURES 3 and 4 as a coil spring, and in FIGURE 1 the location of the valve in piston 4 is shown. It will be seen that the valve is a screw bolt adjustable by means of the head 6. It will further be seen from FIGURES 1 and 3 that the right side of the valve nut acts as a feeler or pushrod on the cylinder head 3 in such manner that on striking the inner face of this cylinder head 3 it is raised from its seat against the action of the spring 7 and is opened, as shown in FIGURE 4.

The mouthpiece A on the pipe B' and the hydraulic cylinder C are enclosed in the protective casing 32 which has a segmental cross section. The front edges of the segment are shaped as toothed rack bars 33a, as will be seen in FIGURES 1, 2, 5 and 6. Particularly in FIGURES 1 and 2, it will further be seen that these rack bars 33a mesh with gears 33 on the axis of pivot 35, 41, with packings 34 between parts 1 and 36. It will be seen in FIGURE 2 how the hydraulic pressure is transmitted from the connections in the spraying tube elbow 36 to the nozzle 9.

The segmental casing 32 is secured by the flange 31 to the gear casing D. Furthermore, the pressure pipe B' is tightly sealed to the gear casing D by the packing ring 16. This casing consists of the cylindrical jacket 21 and the base 22 attached thereto. This base contains the ball bearing 18 which can be held in place or dismantled by attaching the gasket 25 with the gland 23 held by screws 24. Correspondingly the jacket 21 of the gear casing is sealed at both ends by the glands 17 and 26 and is rotatable in the bearings 18' and 20 about the stationary liquid supply pipe B.

The liquid supply pipe B, carries an integral worm wheel 19, meshing with the worm 27 located in the casing 21 and coacting with the ratchet drive 28. This ratchet is actuated by the longitudinal displacement of the pushrod 29, loaded by the adjustably-tensioned spring 30, controlling the length of stroke of the pushrod. Adjustment of spring 30 is effected by a screw showing in FIGURE 1 at the right end of the pushrod 29. When the bottom 11 of the hydraulic cylinder C reciprocating on the hydraulic pipe B' reaches the rear end of its stroke, it strikes against the pushrod 29 and by means of the ratchet drive, rotates the worm 27. Since such worm meshes with the worm wheel 19 which is stationary, rotation of such worm, mounted on casing D, gradually revolves such casing D relative to the liquid supply pipe B. Because the front hydraulic pipe B' is secured to is bled through a small hole 43 in the hydraulic pipe B' and the hydraulic cylinder C, mouthpiece A, and the casing 32 with the pipe B'. The relative positions of all parts of the assembly thus remain unchanged during rotation.

In detail, the arrangement operates in the following manner:

The water under pressure fed to the mouthpiece A is bled through a small hole 43 in the hydraulic pipe B' and a small quantity of liquid under pressure is thus bypassed to the hydraulic reciprocation-controlling element of the spray pipe. The water under pressure filling the left end of the control cylinder C as seen in FIGURE 1 builds up a hydraulic pressure in the space within the cylinder at the left side of piston 4 and forces the valve 39 into the closed position of FIGURE 3 against the force of the spring 7. This hydraulic pressure causes the cylinder C to move to the left relative to piston 4 into the limiting position shown in FIGURE 1. During this movement the liquid in the cylinder C to the right of piston 4 will be released from the cylinder through the pressure relief port 45. Movement of the cylinder bottom 11 into the extreme left position of FIGURE 1 causes it to press against the feeler pin or pushrod 29 to produce mechanically a slight rotation of the assembly A–B–C about the pressure supply pipe line B as previously described.

Movement of the cylinder to the extreme position of FIGURE 1 also causes the cylinder head 3 to strike the adjacent end of valve 39 which slides it lengthwise to the left against the fluid pressure in cylinder 3, as likewise represented in FIGURE 1. The valve is thus moved to the open position shown in FIGURE 4, which opens piston passage 44. The spring 7 now acts to hold the valve 39 open against the fluid pressure; the cleansing fluid then flowing through the piston passage 44 into the space between the piston and the cylinder head 3, which relieves the pressure at the left side of the piston, and the reaction of the liquid being discharged from the nozzle 9 will produce a force moving the cylinder to the right. During such movement pinions 33 roll along rack bars 33a of the casing or cradle 32 to effect corresponding movement of the nozzle 9 into the position swung through 180° as shown by dotted lines in FIGURE 1.

When the pressure at the left of the piston 4 has finally built up a volume of cleansing fluid is escaping through the port 45 corresponding to that flowing into the left end of the cylinder through port 43 and into the right end of the cylinder through the passage 44, the valve 6 will close again by the fluid pressure from the position of FIGURE 4 to that of FIGURE 3. The pressure at the right of the piston continues to fall and the pressure builds up at the left of the piston to force the cylinder C to the left in FIGURE 1 and the action of the device is now repeated.

I claim as my invention:

1. A cleaning jet device, comprising conduit means for supplying fluid under pressure, jet discharge means including a reciprocable discharge tube, means for effecting reciprocation of said discharge tube and nozzle means communicating with and carried swingably by said discharge tube, nonreciprocating rack means extending parallel and adjacent to said discharge tube and relative to which said discharge tube is reciprocable, and gear means reciprocable with said discharge tube and rotatable relative thereto, rigidly connected to said nozzle means, meshing with said rack means and rotated by engagement therewith as said discharge tube reciprocates to swing said nozzle means.

2. The cleaning jet device defined in claim 1, and rotating means connected to the discharge tube to effect rotation thereof and including drive means operated by reciprocation of the discharge tube.

3. The cleaning jet device defined in claim 1, and rotating means connected to the discharge tube to effect rotation thereof and including drive means shifted periodically through predetermined increments in response to reciprocation of the discharge tube.

4. The cleaning jet device defined in claim 1, and rotating means operatively connected to the discharge tube to effect intermittent rotation thereof in response to reciprocation of the discharge tube.

References Cited by the Examiner

UNITED STATES PATENTS

| | | | |
|---|---|---|---|
| 1,215,202 | 2/1917 | Schelter | 239—239 |
| 1,387,165 | 8/1921 | Norton | 239—227 |
| 2,029,788 | 2/1936 | Ostling | 239—227 |
| 2,029,795 | 2/1936 | Richard | 239—241 |

EVERETT W. KIRBY, *Primary Examiner.*